(12) United States Patent
Henmi et al.

(10) Patent No.: US 6,393,197 B2
(45) Date of Patent: May 21, 2002

(54) DIGITAL VIDEO SIGNAL RECORDING/REPRODUCING APPARATUS AND METHOD THEREOF

(75) Inventors: Fumiaki Henmi; Tetsuo Kani; Yoshihiro Murakami; Takao Inoue; Makoto Toyoshima, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/798,281

(22) Filed: Feb. 28, 2001

Related U.S. Application Data

(63) Continuation of application No. 09/047,858, filed on Mar. 25, 1998, now abandoned.

(30) Foreign Application Priority Data

Mar. 28, 1997 (JP) .............................................. 9-078503

(51) Int. Cl.[7] ................................................. H04N 5/91
(52) U.S. Cl. ........................ 386/52; 386/111; 386/112
(58) Field of Search ............................ 386/52, 55, 111, 386/112, 46; 360/15, 32; H04N 5/91

(56) References Cited

U.S. PATENT DOCUMENTS

| 5,267,094 A | 11/1993 | Aoki | 360/32 |
|---|---|---|---|
| 5,479,264 A | 12/1995 | Ueda et al. | 386/111 |
| 5,581,360 A | 12/1996 | Matsumura et al. | 386/52 |
| 5,589,994 A | 12/1996 | Yamasaki et al. | 360/15 |
| 5,706,386 A | 1/1998 | Miyazawa | 386/52 |
| 5,715,104 A | 2/1998 | Takada et al. | 386/52 |
| 5,740,305 A | 4/1998 | Murakami | 386/52 |
| 5,802,240 A | 9/1998 | Asai | 386/52 |
| 5,899,576 A | 5/1999 | Fukuzawa | 386/52 |
| 6,101,313 A | 8/2000 | Igarashi et al. | 386/111 |

Primary Examiner—Huy Nguyen
(74) Attorney, Agent, or Firm—Frommer Lawrence & Haug LLP; William S. Frommer; Joe H. Shallenburger

(57) ABSTRACT

Reproducing heads reproduce signals from a tape in advance of recording heads for a time period equivalent to a system delay. An ECC decoder corrects an error of a signal received from each reproducing head. A BRR decoder decompresses and decodes the signal received from the ECC decoder. A concealing circuit interpolates the signal received from the BRR decoder. An output signal of the concealing circuit is sent back to a selector of the recording system. The selector switches between a signal received from an input terminal and the reproduced signal at the end of each field. An intra-field encoding process or an intra-frame encoding process can be selected as an compressing and encoding process. Information that represents the selected encoding process is recorded on the tape.

7 Claims, 13 Drawing Sheets

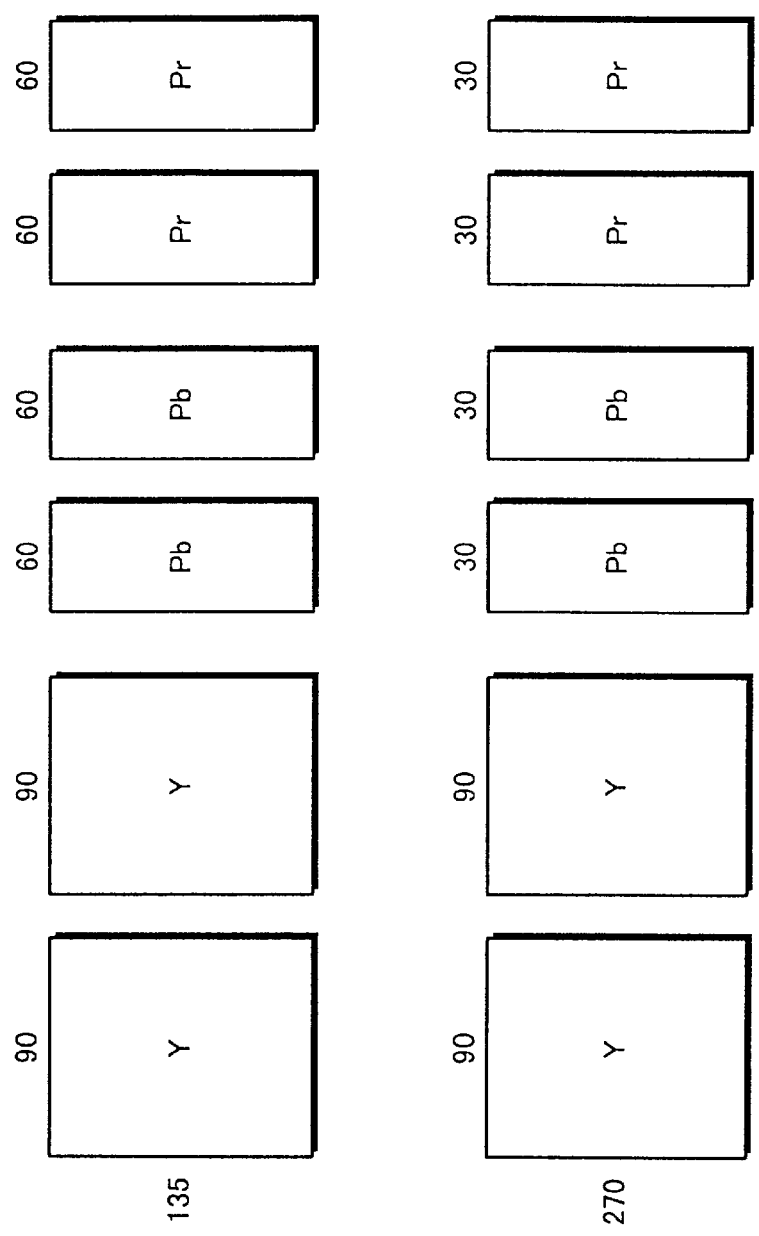

Fig. 9A (4:4:4)SIGNAL, (RGB), 74.25MHz

Fig. 9B (4:2:2)SIGNAL, (y/pb/pr), 74.25MHz

Fig. 9C (3:1:1)SIGNAL, (y/Pb/Pr), 55.6875MHz

Fig. 9D ASIC I/F, 46.40625MHz

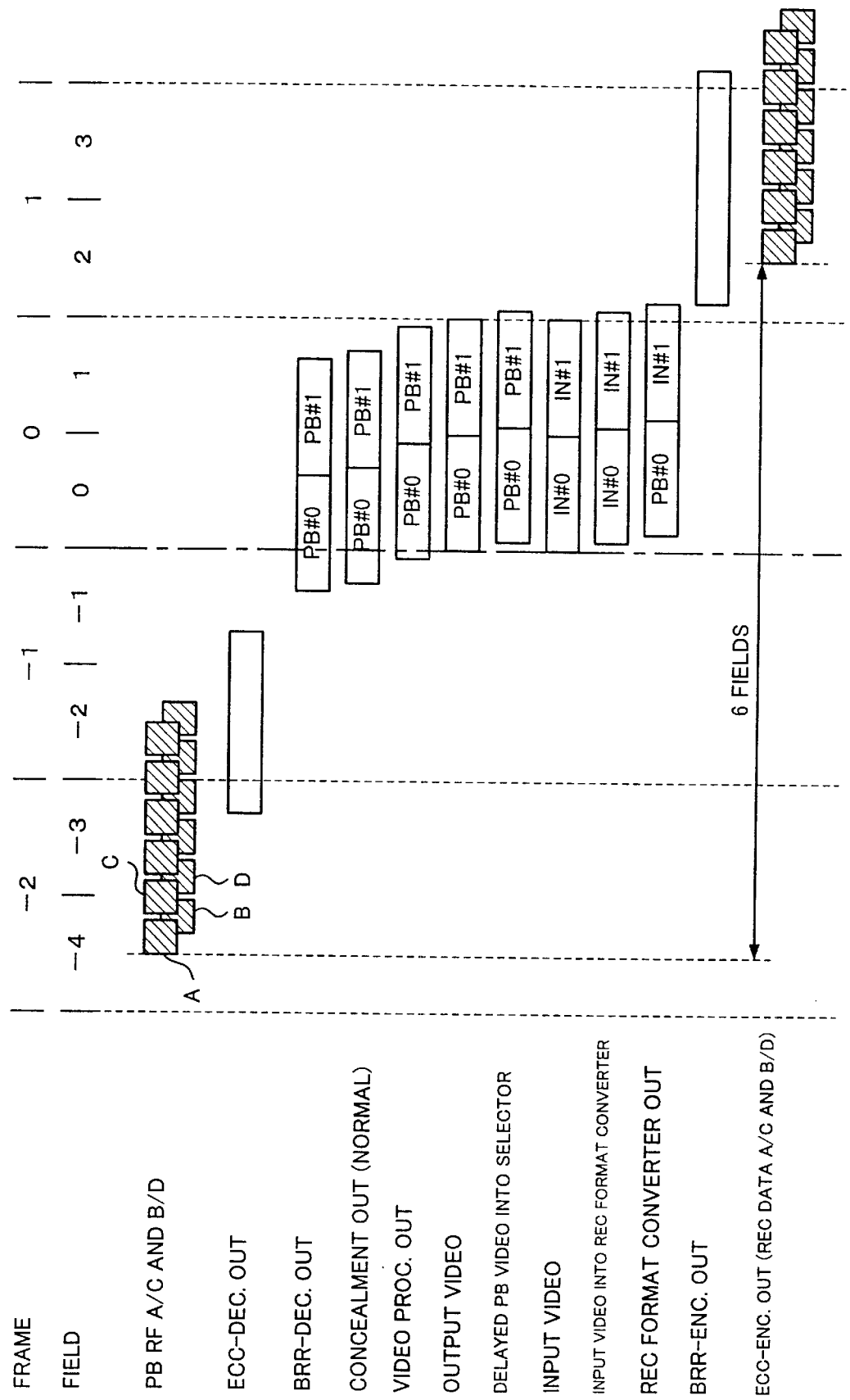

DIGITAL VIDEO SIGNAL RECORDING/ REPRODUCING APPARATUS AND METHOD THEREOF

This application is a continuation of application Ser. No. 09/047,858 filed Mar. 25, 1998, abandoned.

BACKGROUND OF THE INVENTION

1. Field of the Invention

The present invention relates to a digital video signal recording/reproducing apparatus for recording a digital video signal to a record medium and reproducing a digital video signal from a record medium, and a method thereof.

2. Description of the Related Art

A signal processing apparatus that digitally processes a video signal (for example, a signal processing apparatus for use with a digital VTR (Video Tape Recorder) that records/ reproduces a high resolution video signal) performs a picture compressing and encoding process for an input picture signal. The compressed and encoded video signal is recorded to for example a video tape.

As compressing and decoding methods for interlaced video signals, an intra-frame encoding process and an intra-field encoding process are known. The compression efficiency of the intra-field encoding process is generally inferior to the compression efficiency of the intra-frame encoding process. Since the information amount of a high resolution video signal is around five times larger than the information amount of a standard resolution video signal, the intra-frame compressing process should be used.

In a digital VTR, pictures can be edited in individual frames. However, pictures based on a movie film may be edited. Thus, the necessity for editing pictures in individual fields is high. For example, when a movie material with a format of 25 frames/sec is converted into a video signal with a format of 30 frames/sec, a scene change may take place in two fields of the same frame. In this case, a picture should be edited in each field.

In addition to an editing method using two VTRs (a recording VTR and a reproducing VTR), another editing method using one VTR is often used. In the latter method, a picture reproduced from a tape and a picture to be input to the VTR are edited. The edited picture is recorded. The editing method for editing pictures in individual fields with one VTR is referred to as field editing method.

When the field editing method is performed in the intra-frame compressing and encoding process (namely, a picture should be edited at the end of a field), a frame may contain pictures that scarcely correlate with each other in the fields, for example. Namely, when the intra-frame compressing and encoding process is performed, the compressing efficiency may not be improved. In addition, since a picture is compressed in each frame, an output signal of the error correction decoder cannot be edited in each field.

OBJECTS AND SUMMARY OF THE INVENTION

Therefore, an object of the present invention is to provide a digital video signal recording/reproducing apparatus that allows pictures to be edited in individual fields and that prevents the compressing efficiency from being deteriorated.

The present invention is a digital video signal recording/ reproducing apparatus for recording a digital video signal to a record medium and reproducing a digital video signal from a record medium, comprising:

a first encoder for performing a compressing process for an input digital video signal;

a second encoder for performing an error correction code encoding process for a compressed signal received from said first encoder;

recording means for recording an output signal of said second encoder to a record medium;

reproducing means for reproducing a signal from a record medium;

a second decoder for performing an error correction code decoding process for a signal received from said reproducing means;

a first decoder for performing a decompressing process for an output signal of said second decoder; and switching means, disposed in the preceding stage of said first encoder, for switching between a reproduced digital video signal that has been decompressed by said first decoder and the input digital video signal at the end of each field.

The present invention is a digital video signal recording/ reproducing method for recording a digital video signal to a record medium and reproducing a digital video signal from a record medium, comprising the steps of:

compressing an input digital video signal;

encoding the compressed signal with an error correction code;

recording the signal that has been encoded with the error correction code to a record medium;

reproducing a signal from a record medium;

decoding the reproduced signal that has been encoded with the error correction code;

decompressing the decoded signal; and switching between a reproduced digital video signal that has been decompressed and the input digital video signal at the end of each field.

In the digital VTR, decompressed video data is sent back to a switching means of the recording system. The switching means switches between reproduced data and input data at the end of each field. Thus, a field editing process can be accomplished for a digital VTR. In the compressing and encoding process, the intra-field encoding process or the intra-frame encoding process can be selected. When information that represents the selected encoding process is recorded, even if a picture largely varies at the end of a field, the compressing efficiency can be prevented from being deteriorated.

The above, and other, objects, features and advantage of the present invention will become readily apparent from the following detailed description thereof which is to be read in connection with the accompanying drawings.

BRIEF DESCRIPTION OF THE DRAWINGS

FIG. 8 is a schematic diagram showing a block segmenting process of the BRR encoder;

FIGS. 9A to 9D are schematic diagrams showing a compressing process with a data format according to an embodiment of the present invention;

FIG. 14 is a timing chart for explaining a recording/reproducing process and a field editing process according to an embodiment of the present invention.

DETAILED DESCRIPTION OF THE PREFERRED EMBODIMENTS

Figure 1:
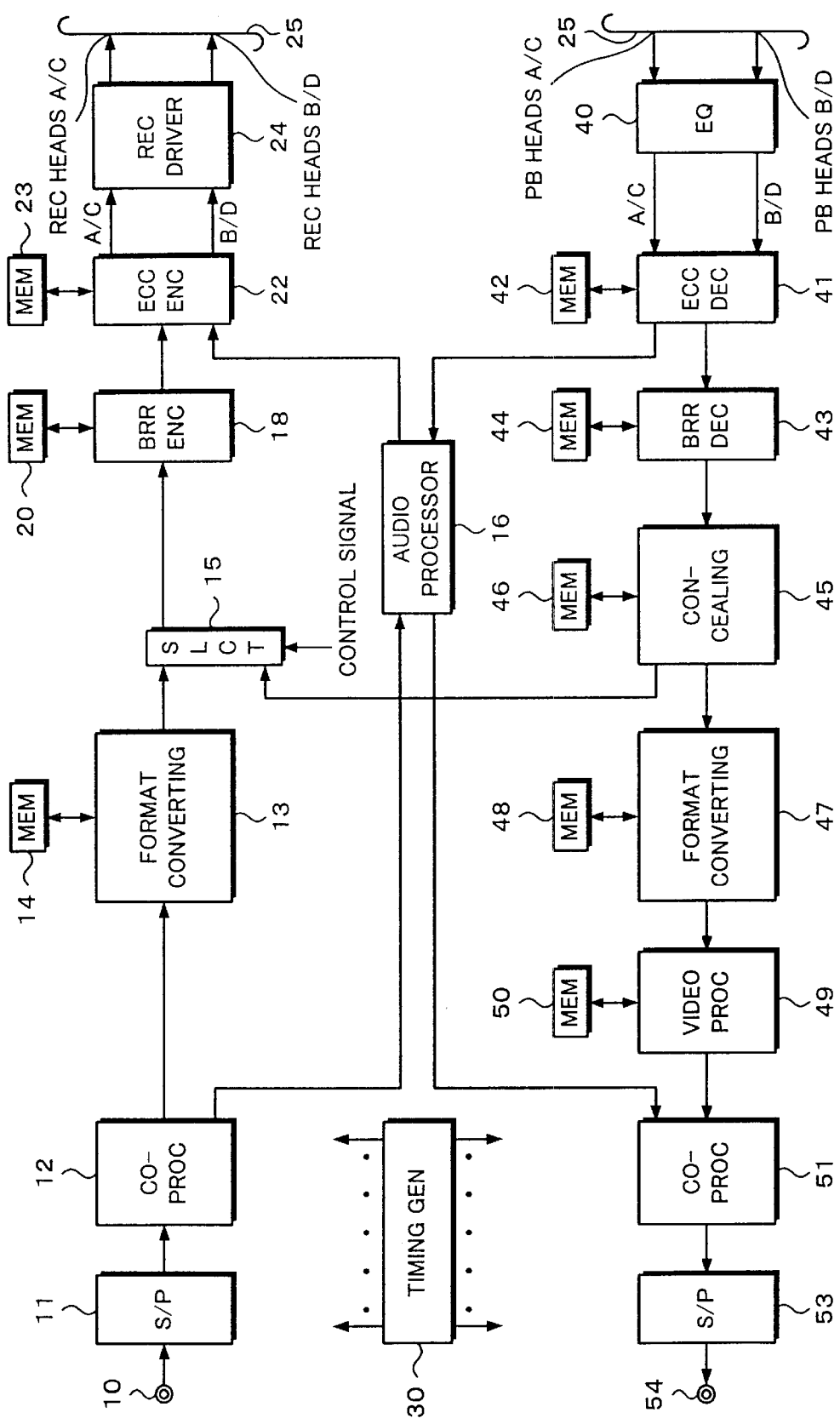
FIG. 1 is a block diagram showing an example of the structure of a recording/reproducing system according to an embodiment of the present invention.

Next, with reference to the accompanying drawings, a digital VTR according to an embodiment of the present invention will be described. The digital VTR according to the embodiment of the present invention records a high resolution video signal and reproduces a high resolution video signal from a magnetic tape. FIG. 1 shows an example of the structure of a recording system and a reproducing system according to the embodiment of the present invention.

Referring to FIG. 1, a serial digital A/V signal with a data rate of 1.485 Gbps (bits per second) corresponding to BTA S-004 standard is supplied to an input terminal 10. The serial digital A/V signal is sent to an S/P (serial to parallel) converter 11. The serial signal sent to the S/P converter 11 is converted into parallel data composed of a brightness signal Y and color difference signals Pr and Pb. Each of the brightness signal Y and color difference signals Pr and Pb is composed of for example eight bits. The data clock frequency of the parallel digital video signal is 74.25 MHz.

The parallel data is sent from the S/P converter 11 to a coprocessor 12. The coprocessor 12 is composed of for example one ASIC (Application Specific Integrated Circuit). The coprocessor 12 performs a process for auxiliary data and thereby separates a digital audio signal, a line number LN, and EAV from the serial data. The digital audio signal is sent to an audio processor 16. The coprocessor 12 performs a CRC checking operation with a CRC redundant code so as to determine whether or not an error takes place on the transmission line (namely, a transmission error). Alternatively, the CRC checking operation may be performed in a format converter 13 disposed in the next stage of the coprocessor 12.

An output signal of the coprocessor 12 is sent to the format converter 13. The format converter 13 performs a filtering process for compressing a (4:2:2) signal into a (3:1:1) signal. When the coprocessor 12 detects an error, the format converter 13 determines whether a connection point of a signal takes place with the continuity of successive line numbers. The format converter 13 compresses the band width of a signal. The format converter 13 is composed of for example one ASIC. A memory 14 is connected to the format converter 13. A timing generator 30 supplies clock signals with frequencies of 74.25 MHz and 46.40625 MHz to the format converter 13.

The format converter 13 converts the (3:1:1) signal into two-channel data. In FIG. 1, for simplicity, only one signal path is shown. In the circuits downstream of the format converter 13, data is processed for each channel. Data on each channel has a data rate of 46.40625 MHz. In each line, line numbers $LN_0$ and $LN_1$ are placed in channel data $Ch_0$ and channel data $Ch_1$, respectively.

The parallel (4:2:2) signal is converted into the signals $Ch_0$ and $Ch_1$ each of which has the brightness signal Y and the color difference signals Pr and Pb serially arranged. Thus, the clock frequency of 74.25 MHz can be decreased to 5/8 (namely, 46.40625 MHz). In addition, the brightness signal Y and the color difference signals Pr and Pb can be processed at the same clock frequency.

An output signal (of two channels) of the format converter 13 is sent to a selector 15. When the field editing process is performed, the selector 15 selects a self-reproduced signal instead of the output signal (input video signal) of the format converter 13. A control signal is sent to the selector 15. The control signal causes the selector 15 to operate in synchronization with the end of each field. In reality, when the user designates an editing point in a particular field, the control signal causes the selector 15 to switch the input video signal to a reproduced video signal corresponding to the editing point. For simplicity, FIG. 1 shows the selector 15 as an independent circuit block. However, the selector 15 is actually structured in an IC chip of the format converter 13.

The video signal selected by the selector 15 is sent to a BRR (Bit Rate Reduction) encoder 18. A memory 20 is connected to the BRR encoder 18. The BRR encoder 18 performs a compressing and encoding process that includes for example a DCT (Discrete Cosine Transform) process, a quantizing process, and a variable-length code encoding process. In this example, the picture compressing rate is 1/4.4. In addition, the BRR encoder 18 adaptively switches between the intra-field compressing process and the intra-frame compressing process. In addition, the BRR encoder 18 shuffles DCT blocks.

The two-channel data that has been compressed and encoded by the BRR encoder 18 is sent to an ECC (Error Correction Code) encoder 22. In addition, the digital audio signal of which a particular process has been performed by the audio processor 16 is also sent to the ECC encoder 22. A memory 23 is connected to the ECC encoder 22.

The ECC encoder 22 encodes the digital audio signal with a product code. Namely, the ECC encoder 22 encodes the digital audio signal with an outer code, adds an ID portion that includes a sync block number and various flags to each sync block recorded on a tape, and then encodes the resultant signal with an inner code. The range of the encoding process with the inner code includes the ID portion. One sync block includes the parity of the inner code and a sync signal that represents the top portion thereof. One sync block is the minimum data element that is recorded and reproduced.

An output signal of the ECC encoder is sent to a recording driver 24. Record data of one channel is sent from the recording driver 24 to magnetic heads A/C through a rotating transformer. Record data of the other channel is sent from the recording driver 24 to magnetic heads B/D through a rotating transformer. The record data is recorded on a magnetic tape 25.

The recording system has a timing generator 30 that supplies a system clock signal corresponding to an applied format such as 1125 lines/60 Hz format, 1125 lines/59.94 Hz format, or 525 lines/59.94 Hz format. Corresponding to the system clock signal, a clock signal necessary for the recording system is generated.

Next, the structure of the reproducing system will be described. Signals recorded on the magnetic tape 25 are reproduced by the reproducing magnetic heads A/C and B/D. Thus, two-channel reproduction signals are obtained. A reproduction signal A/C of one channel is sent to an equalizer 40. A reproduction signal B/D of the other channel is sent to the equalizer 40. The equalizer 40 is disposed for each channel. In addition, individual processes in the downstream stages of the format converter 47 are performed for each channel.

Output signals of the equalizer 40 are sent to an ECC decoder 41. A memory 42 is connected to the ECC decoder 41. The ECC decoder 41 corrects an error of a signal received from the equalizer 40 with an inner code of an error correction code. The inner code is completed in one sync block. When an error can be corrected with the inner code, the ECC decoder 41 corrects the error. When an error cannot be corrected with the inner code, the ECC decoder 41 sets an error flag at the position of the error. Thereafter, the ECC decoder corrects an error of the signal with an outer code. With reference to the error flag, the ECC decoder 41 performs an erasure-correcting process for the error. Thus, most errors can be corrected. However, when a large error such as an error that takes place in the longitudinal direction of the tape, the ECC decoder 41 cannot correct the error. In this case, the ECC decoder 41 detects an error in the error detecting range of the outer code and sets a word error flag to the position of an error word.

The error correcting decoder 41 outputs data and word error flag as sync blocks corresponding to the clock signal of 46.40625 MHz. An output signal of the error correcting decoder 41 is sent to a BRR decoder 43. The clock signal of 46.40625 MHz is supplied from the timing generator 30 to the BRR decoder 43. The BRR decoder 43 performs an inverse DCT converting process and a deshuffling process with a memory 44 and decodes the compressed signal. The BRR decoder 43 performs an intra-field decoding process/intra-frame decoding process corresponding to the intra-field encoding process/intra-field encoding process performed by the BRR encoder 18. Information that represents the type of the encoding process is placed in the ID portion of each sync block.

An output signal of the BRR decoder 43 is sent to a concealing circuit 45 along with the error flag. The concealing circuit 45 is composed of for example one ASIC. A memory 46 is connected to the concealing circuit 45. The concealing circuit 45 conceals an error that the ECC decoder cannot correct (such as a large error due to a scratch on the magnetic tape 4) in the reproduction signal. For example, the concealing circuit 45 interpolates in a predetermined manner an error portion that has not been corrected. For example, the BRR decoder 43 determines an error of a DCT coefficient corresponding to the word error flag. When a DC coefficient or a low order AC coefficient that is a relatively important coefficient has an error, the BRR decoder 43 does not decode such a DCT block. In this case, the BRR decoder 43 sends the conceal flag to the concealing circuit 45. The concealing circuit 45 interpolates the relevant DCT block.

An output signal of the concealing circuit 45 is sent to the format converter 47 and the selector 15 of the recording system. The selector 15 selects an output signal of the concealing circuit 45 (namely, a reproduced video signal). Thus, the field editing process is performed.

The format converter 47 suppresses irregular noise that takes place in the decompressing process/compressing process of the BRR decoder or the BRR encoder 18 of the recording system. The format converter 47 performs a noise suppressing process corresponding to the clock signal of 46.40625 MHz with a memory 48.

The format converter 47 receives the clock signals of 46.40625 MHz and 74.25 MHz from the timing generator 30. The format converter 47 converts the two-channel signals into a (4:2:2) signal corresponding to the clock signals with the memory 48. The format converter 47 adds a line number to the converted signal. The format converter 47 sends the resultant signal with a data rate of 74.25 MHz to a video processor 49.

A memory 50 is connected to the video processor 49. The video processor 49 adjusts a gain, an offset, and so forth of the received video signal. An output signal of the video processor 49 is sent to a coprocessor 51. In addition, reproduced audio data is sent from the audio processor 16 to the coprocessor 51. The audio data is decoded with an error correction code by the ECC decoder 41 and then sent to the audio processor 16. The audio processor 16 performs a particular process for the audio signal and sends the resultant signal to the coprocessor 51.

The coprocessor 51 places the digital audio signal in the (4:2:2) signal corresponding to the clock signal of 74.25 MHz and adds predetermined auxiliary data corresponding to the relevant format to the resultant signal. For example, the coprocessor 51 performs a CRC calculation for each line of the resultant signal and generates a CRC code. With the CRC code, a transmission error can be detected. An output signal of the coprocessor 51 is sent to a P/S (Parallel to Serial) converter 53. The P/S converter 53 converts the parallel signal into a serial digital A/V signal with a data rate of 1.485 Gbps. An output signal of the P/S converter 51 is sent as reproduced serial data to an output terminal 54.

In the structure of the reproducing system, an interface signal sent from the BRR decoder 43 to the format converter 47 (composed of relevant ASICs) is processed in the same format and corresponding to the same clock signal (46.40625 MHz). Line numbers $LN_0$ and $LN_1$ are added to the two-channel output signal of the BRR decoder 43. The signal with the line numbers $LN_0$ and $LN_1$ is sent to the downstream circuits. Thus, even if the continuity of the line numbers is lost, a relevant error can be easily detected.

In the structure shown in FIG. 1, an output signal of the concealing circuit 45 is sent back to the selector 15 of the recording system. Alternatively, another signal path for the field editing process may be used. In other words, the output signal of the BRR decoder 43 may be sent to the selector 15. In this case, a picture signal that has not been interpolated is recorded. Thus, a particular flag should be used so that when the picture signal is output, it is interpolated. As another alternative method, the video processor 49 may send a processed video signal back to the recording system (the preceding stage of the format converter 13).

Figure 2:
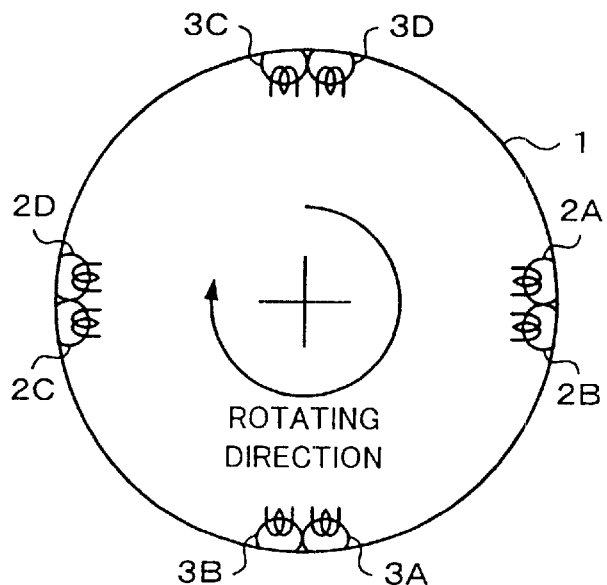
FIG. 2 is a schematic diagram showing an arrangement of heads.
Figure 3:
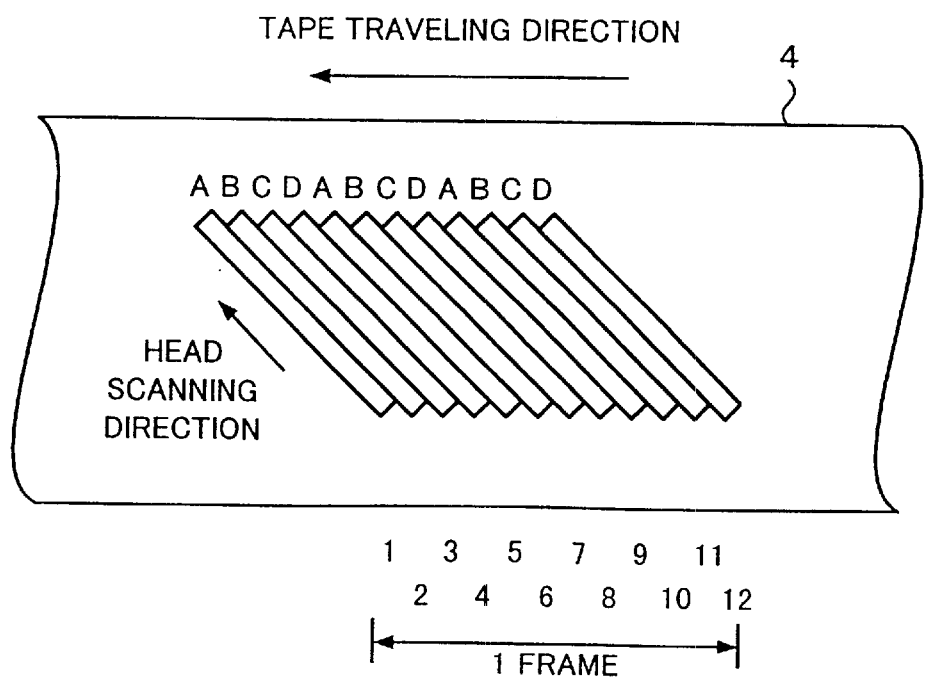
FIG. 3 is a schematic diagram showing a track format of a magnetic tape.

FIG. 2 shows an arrangement of rotating heads. FIG. 3 shows a track pattern on a magnetic tape. As shown in FIG. 2, four recording magnetic heads 2A, 2B, 2C, and 2D are disposed on a rotating drum 1 that rotates at for example 90 Hz. Double azimuth heads are used so that the magnetic heads 2A and 2B are adjacently disposed. The magnetic heads 2A and 2B are composed of a double azimuth head so that they are adjacently disposed. Likewise, the magnetic heads are adjacently disposed. The azimuth angles of the magnetic heads are different from each other. Likewise, the azimuth angles of the magnetic heads 2C and 2D are different from each other. The magnetic head 2A is disposed opposite to the magnetic head 2C (namely, with an angle of 180°). The magnetic head 2C is disposed opposite to the magnetic head 2D (namely, with an angle of 180°).

A magnetic tape is wound around the rotating drum 1 with a winding angle of 180°. The magnetic heads and the signal systems are switched so that a record signal is sent and a reproduction signal is obtained while the magnetic heads are tracking the magnetic head. A point at which the magnetic heads and the signal systems are switched is referred to as a switching point. Now, assuming that tracks corresponding to the heads are denoted by A, B, C, and D, as shown in FIG. 3, the magnetic heads 2A and 2B form the tracks A and B at the same time. In addition, the magnetic heads 2C and 2D form the tracks C and D at the same time.

A segment is composed of a pair of two adjacent tracks (a pair of A and B channels and a pair of C and D channels) that have different azimuth angles. One frame (1/30 second) of a video signal is composed of 12 tracks. Thus, one frame of a video signal is composed of six segments. Six segments are designated segment numbers 0 to 5. Audio data of four channels is recorded at a center portion of each track so that the audio data is sandwiched by video data.

Reproducing magnetic heads 3A, 3B, 3C, and 3D are also disposed on the magnetic drum 1. The relation of the arrangement and azimuth angles of the reproducing magnetic heads 3A, 3B, 3C, and 3D is the same as the relation of those of the recording magnetic heads 2A, 2B, 2C, and 2D. According to an embodiment of the present invention, when a reproduction signal is sent back to the selector 15, a system delay takes place from the beginning of the reproduction signal of the tape to the beginning of a record signal to the tape. For example, there is a system delay of six fields.

In FIG. 2, for simplicity, the reproducing magnetic heads 3A to 3D are disposed in advance of the recording magnetic heads 2A to 2D by 90°, respectively. Actually, the reproducing magnetic head 3A to 3D are disposed in advance of the recording magnetic heads 2A to 2D by an angle equivalent to the system delay, respectively. Thus, a signal reproduced from the magnetic tape 25 and a signal that has been field-edited (the output signal of the selector 15) are newly recorded in synchronization with a signal recorded on the magnetic tape 25.

Figure 4:
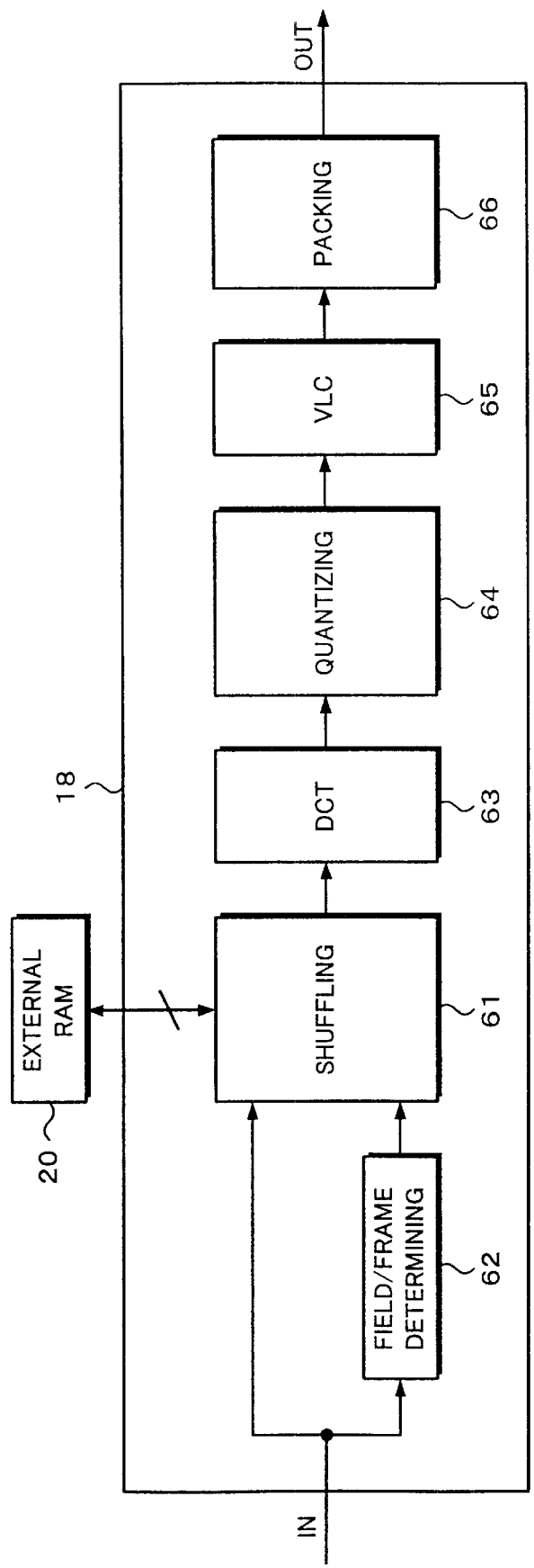
FIG. 4 is a block diagram showing an example of a BRR encoder.

FIG. 4 shows an example of the BRR encoder 18. An output signal of the selector 15 is sent to a shuffling circuit 61 and a mode determining circuit 62. The mode determining circuit 62 determines a compressing and encoding mode (field mode/frame mode) and generates a mode ID. The mode ID is sent to the shuffling circuit 61. The shuffling circuit 61 performs a block segmenting process for DCT blocks in a field or DCT blocks in a frame corresponding to the mode ID and shuffles DCT blocks with the external memory 20.

An output signal of the shuffling circuit 61 is sent to a DCT circuit 63. The DCT circuit 63 performs a discrete cosine transforming process for the signal received from the shuffling circuit 61 and generates coefficient data. The coefficient data is sent to a quantizing circuit 64. The quantizing circuit 64 quantizes the coefficient data. The quantizing circuit 64 controls a quantizing step so as to generate a predetermined amount of data (namely, the quantizing circuit 64 designates an amount of data packed to a plurality of sync blocks or an amount of data recorded to one track).

An output signal of the quantizing circuit 64 is sent to a variable-length code encoding circuit 65. An output signal of the variable-length code encoding circuit 65 is sent to a packing circuit 66. The packing circuit 66 packs the signal received from the variable-length code encoding circuit 65 to a sync block. An output signal of the packing circuit 66 is sent to the ECC encoder 22 (shown in FIG. 1).

Figure 5:
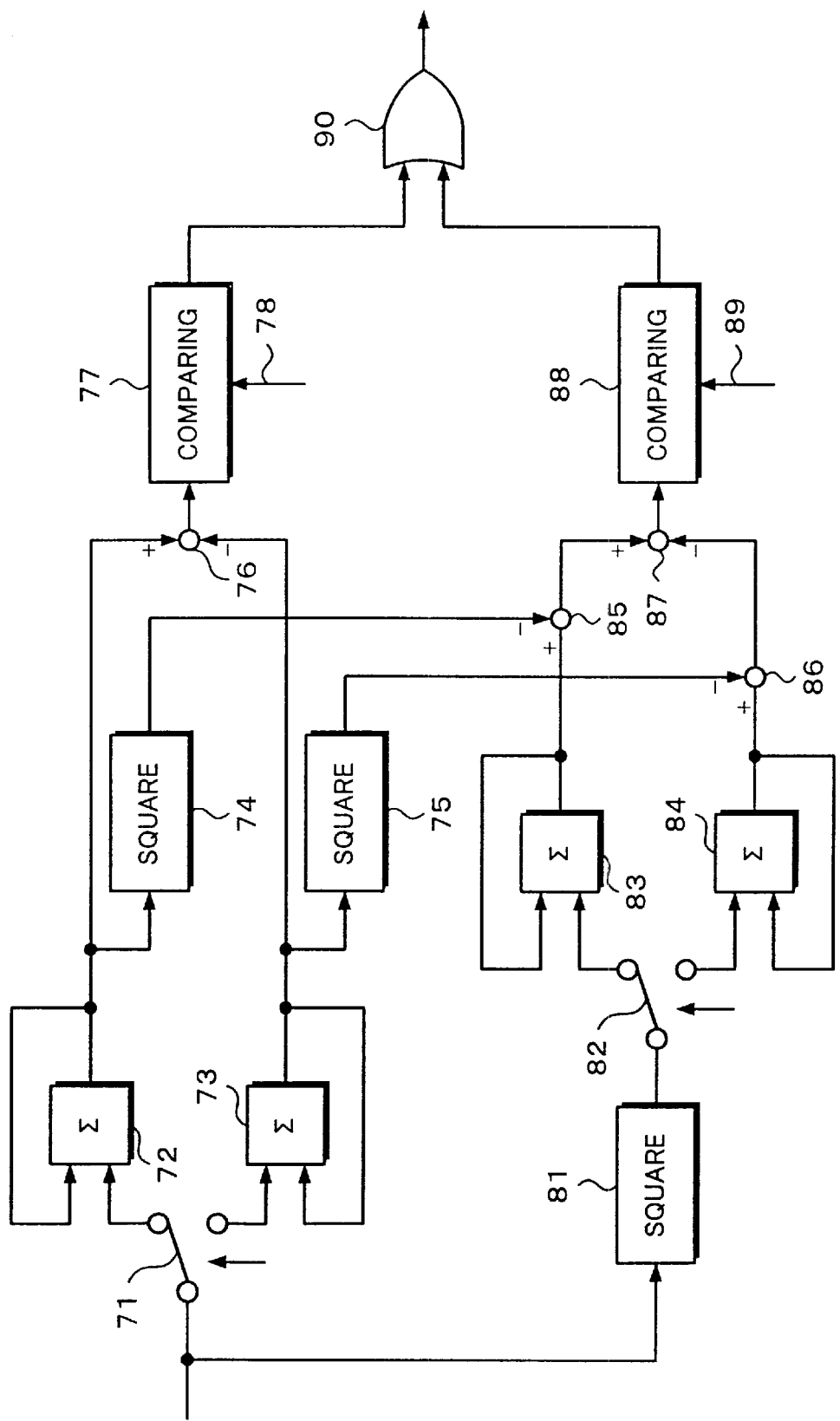
FIG. 5 is a block diagram showing an example of a mode determining circuit of the BRR encoder.

FIG. 5 shows an example of the structure of the mode determining circuit 62. In this circuit, with the sum and variance of pixel values in each field, the degree of the difference of two fields of one frame is evaluated. An input signal of the mode determining circuit 62 is sent to a switching circuit 71. The switching circuit 71 sends data of two fields to cumulating circuits 72 and 73. Each of the cumulating circuits 72 and 73 obtains the sum of the pixel values of each field. A subtracting circuit 76 obtains the difference of the sums of the pixel values of the individual fields.

A comparing circuit 77 compares the difference with a threshold value 78 received from the outside of the mode determining circuit 62. When the difference is smaller than the threshold value, the comparing circuit 77 generates a signal that represents "0". When the difference is larger than the threshold value, the comparing circuit 77 generates a signal that represents "1". An output signal of the comparing circuit 77 is sent to an OR gate 90.

In addition, an input signal of the mode determining circuit 62 is sent to a square calculating circuit 81. A switching circuit 82 sends an output signal of the square calculating circuit 81 cumulating circuits 83 and 84 corresponding to individual fields. An output signal of the cumulating circuit 83 and an output signal of the square calculating circuit 74 are sent to a subtracting circuit 85. The subtracting circuit 85 outputs the variance of the pixel values of one field. Likewise, with the cumulating circuit 84, a subtracting circuit 86, and a square calculating circuit 75, the variance of the pixel values of the other field is obtained.

The variances of the individual fields are sent to a subtracting circuit 87. The subtracting circuit 87 calculates the difference of these variances. The difference of the variances is sent to a comparing circuit 88. The comparing circuit 88 compares the difference with a threshold value 89 received from the outside of the mode determining circuit 62. When the difference of the variances is smaller than the threshold value, the comparing circuit 88 generates a signal that represents "0". When the difference of the variances is larger than the threshold value, the comparing circuit 88 generates a signal that represents "1". An output signal of the comparing circuit 88 is sent to the OR gate 90.

When the difference of the sums of the pixel values of the individual fields is larger than the relevant threshold value or when the difference of the variances of the pixel values of the individual fields is larger than the relevant threshold value, the OR gate 90 generates a signal that represents "1". Otherwise, the OR gate 90 generates a signal that represents "0". When the OR gate 90 generates the signal that represents "1", the mode determining circuit 62 determines that: the difference of pictures in the individual frames is large. In other words, the mode determining circuit 62 determines that the movement of a picture is large and selects the intra-field encoding process (field mode). When the OR gate 90 generates the signal that represents "0", the mode determining circuit 62 determines that the difference of the pictures in the frames is small. In other words, the mode determining circuit 62 determines that the movement of a picture is small and selects the intra-frame encoding process (frame mode). In addition, an output signal of the mode determining circuit 62 (OR gate 90) is placed in the ID of each sync block. The method for detecting the movement of a picture in the fields is not limited to the above-described method. Instead, various methods such as a method using an average value and a method using the sum of absolute values of differences between frames can be used.

Figure 6:
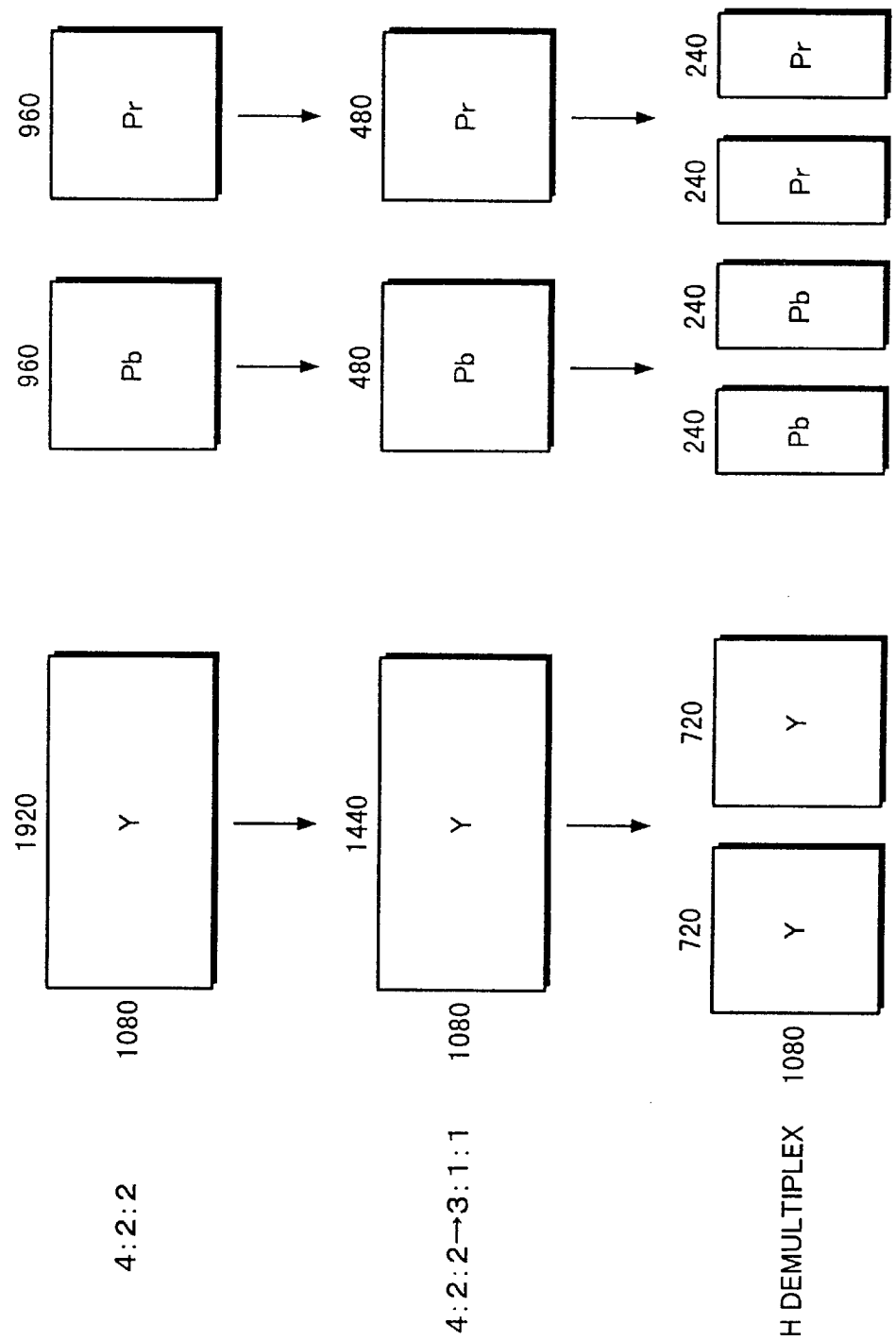
FIG. 6 is a schematic diagram showing a data compressing process according to an embodiment of the present invention.

FIG. 6 is a schematic diagram showing a compressing process for compressing the amount of data of a high resolution video signal according to an embodiment of the present invention. For example, the high resolution video signal is a video signal photographed by a high resolution video camera using a CCD. The high resolution video signal is composed of RGB components of three primary colors. The high resolution signal is a (4:4:4) signal of which the ratio of the sampling frequencies of these components is 4:4:4. The RGB signal is converted into a component signal ((4:2:2) signal) composed of a brightness signal Y, a red color difference signal Pr, and a blue color difference signal Pb.

One frame of a signal photographed by a high resolution video camera is composed of 2200 H×1125 V pixels (where H represents the number of pixels in one line; and V represents the number of pixels in one frame). As represented by an upper portion of FIG. 6, the signal Y (brightness signal) of the (4:2:2) signal represents a valid area of the frame. The signal Y is composed of 1920 H×1080 V. Each of the signals Pr and Pb is composed of 960 H×1080 V. The (4:2:2) signal and digital audio signal are sent as serial data with a predetermined format to the input terminal 10 of the recording system. In this format, the audio data and additional data (error detecting CRC. line number, and so forth) are sent using other than the valid area.

Figure 7:
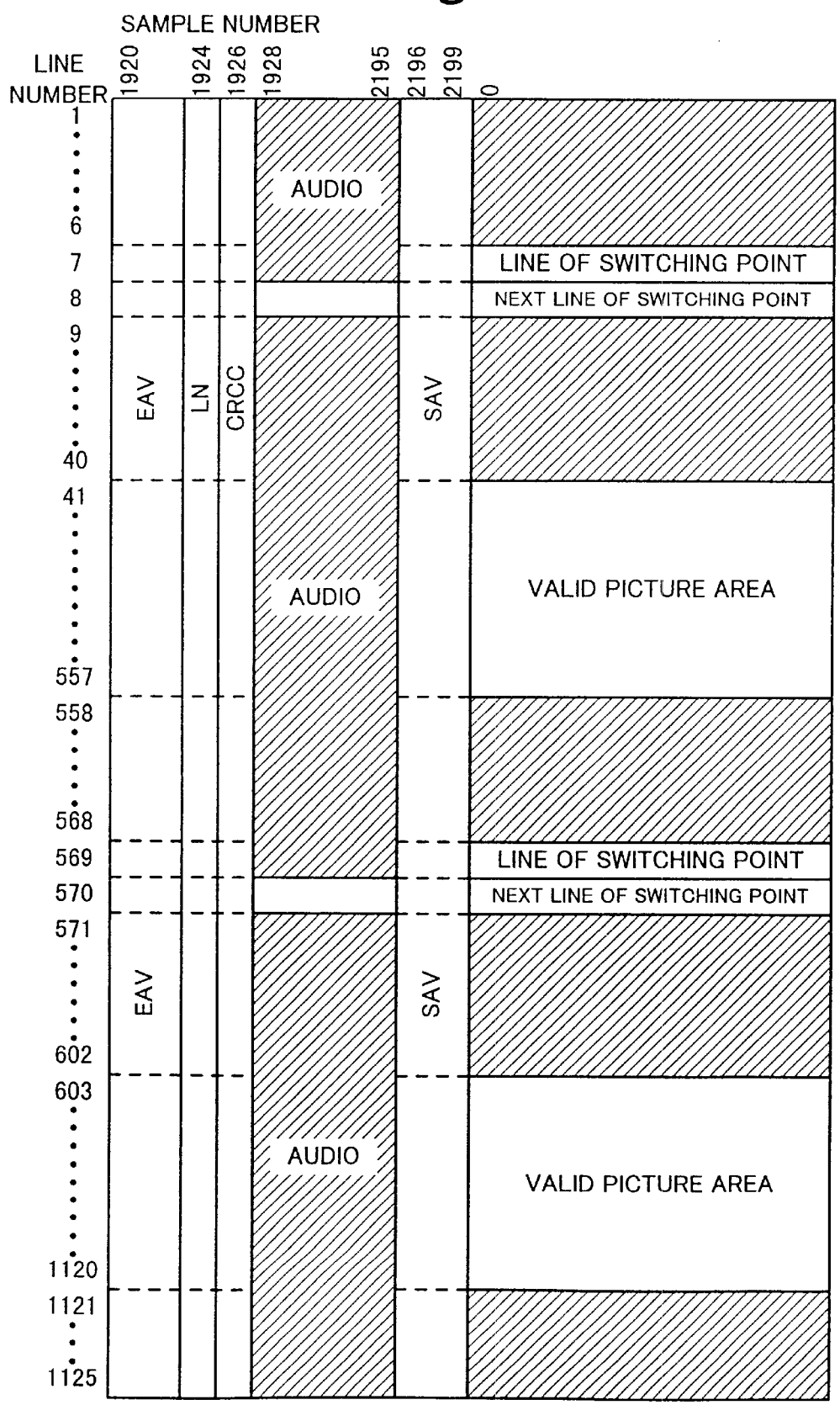
FIG. 7 is a schematic diagram showing a transmission format of a serial digital A/V signal.

FIG. 7 shows a serial digital A/V signal with a data rate of 1.485 Gbps corresponding to BTA S-004 standard that is an example of a transmission format of serial data. In FIG. 7, numbers in the vertical direction represent line numbers. Numbers in the horizontal direction represent sample numbers. Data is serially sent in the ascending order of line numbers and picture sample numbers. Picture data and audio data of one frame composed of 2200 samples in the horizontal direction and 1125 lines in the vertical direction are sent.

In the horizontal direction, 1920 samples from 0-th sample to 1919-th sample are samples in a valid picture area. In lines of other than a vertical blanking interval, a video signal is sent. SAV that represents the beginning of a valid picture area is placed from the 2196-th sample to the 2199-th sample. EAV that represents the end of a valid picture area is placed from the 1920-th sample to the 1923-rd sample. An audio signal is sent with 268 samples from the 1928-th sample to the 2195-th sample. A line number LN is placed in the 1924-th sample and the 1925-th sample. A check bit of CRCC (Cyclic Redundancy Check Code) of relevant lines is placed in the 1926-th sample and the 1927-th sample.

In the vertical direction, the 1-st line to 40-th line, the 558-th line to 602-nd line, and the 1121-st to 1125-th lines are vertical blanking intervals. For example, a switching point of a helical scan type video head is placed in a vertical blanking interval. A video signal for one field is sent with the 0-th sample to 1919-th sample in the 41-st line to 557-th line and the 603-rd line to 1120-th line.

As shown in FIG. 7, an audio signal is sent in other than the next line of a switching point. In this format, data and signal out of the valid picture area in the horizontal direction is referred to as auxiliary data.

The format converting circuit 13 (see FIG. 13) converts a (4:2:2) signal into a (3:1:1) signal. As shown in FIG. 6, the signal Y of the (3:1:1) signal is composed of 1440 H×1080 V. Each of the signals Pr and Pb of the (3:1:1) signal is composed of 480 H×1080 V. In addition, the format converting circuit 13 perform a demultiplexing process (H-demultiplexing process) that separates the (3:1:1) signal into two channels in the horizontal direction. Thus, as represented by a lower portion of FIG. 6, the signal Y of each channel is composed of 720 H×1080 V. Each of the signals Pr and Pb of each channel is composed of 240 H×1080 V.

In the downstream circuits of the format converting circuit 13, individual processes are performed for two channels. The data rate of the serial data received from the input terminal 10 is 1.485 GHz. The S/P converter 11 converts the serial data into parallel data with a data rate of 74.25 MHz. The format converting circuit 13 outputs data with a data rate of 44.4062 MHz (=74.25 MHz×⅗) for each channel.

As described above, the BRR encoder 18 has the field mode and the frame mode. In the field mode, the BRR encoder 18 forms DCT blocks in a field and performs the DCT encoding process for the DCT blocks. In the frame mode, the BRR encoder 18 forms DCT blocks in a frame and performs the DCT encoding process for the DCT blocks. The information that represents the field mode or frame mode is placed in the ID of each sync block. When the difference of pictures of the two fields of one frame is small (namely, the movement of a picture is small), the frame mode is selected. On the other hand, when the difference of pictures is large (namely, the movement of a picture is large), the field mode is selected. FIG. 8 shows a block segmenting process for DCT blocks in the frame mode and the field mode.

In the frame mode, a picture of one frame is divided into DCT blocks of (8 H×8 V) (Y) and (4 H×8 V) (Pr/Pb). Thus, as represented by an upper portion of FIG. 8, on each channel and in each frame, a (90×135) block (Y) and (60×135) blocks (Pr/Pb) are formed. When DCT blocks are shuffled, for DCT blocks (Pr/Pb), every two blocks are treated as a pair. Thus, when DCT blocks are shuffled, a (30×135) block (Pr/Pb) is formed.

On the other hand, in the field mode, a picture of one frame is divided into DCT blocks of (8 H ×4 V) (Y, Pr/Pb). The number of lines of each DCT block is the half of that in the frame mode. This is because the length of one DCT block in the field mode is matched with that in the frame mode. Thus, as represented by a lower portion of FIG. 8, on each channel and in each frame, a (90×270) block (Y) and (30×270) blocks (Pr/Pb) are formed. In these structures of DCT blocks, DCT blocks are placed in different positions from the original positions in the frames. In other words, the DCT blocks are shuffled. Thus, the amount of data that has been compressed and encoded is averaged in DCT blocks.

Next, a data compressing process according to an embodiment of the present invention will be described with an example of the case that data of one line is compressed. For example, as shown in FIG. 9A, a video signal that is output from a CCD is a (4:4:4) signal of which a red signal R, a green signal G, and a blue signal B are sent in parallel. Each of the parallel signals has a data width of for example eight bits. One pixel is composed of a set of $R_n$, $G_n$, and $B_n$ signals. Thereafter, the (4:4:4) signal is converted into a (4:2:2) signal (see FIG. 9B). The (4:2:2) signal is supplied in the format of serial data shown in FIG. 7 from the input terminal 10. Data shown in FIG. 9B is output from the coprocessor 12 that decomposes the serial format.

The format converting circuit 13 converts the (4:2:2) signal into a (3:1:1) signal (see FIG. 9C). The frequency of the clock signal of the (3:1:1) signal is 55.6875 MHz. In addition, the format converting circuit 13 converts the (3:1:1) signal into two-channel signals $Ch_0$ and $Ch_1$ of which the Y, Pr, and Pb signals are arranged in serial. The frequency of the clock signal of the signals $Ch_0$ and $Ch_1$ is 46.40625 MHz (=74.25 MHz×⅝).

A line number LN is placed in each of the signal $Ch_0$ and $Ch_1$. The line number LN is sent to each structural portion along with data. When a signal is processed, the line number LN is referenced for controlling a memory address and a data order. Thus, even if the continuity of lines is lost due to a particular cause, data can be compensated in the order of line numbers.

For simplicity of the compressing process, FIGS. 9A to 9D show only video data (V, Pr/Pb).

Figures 10A, 10B:
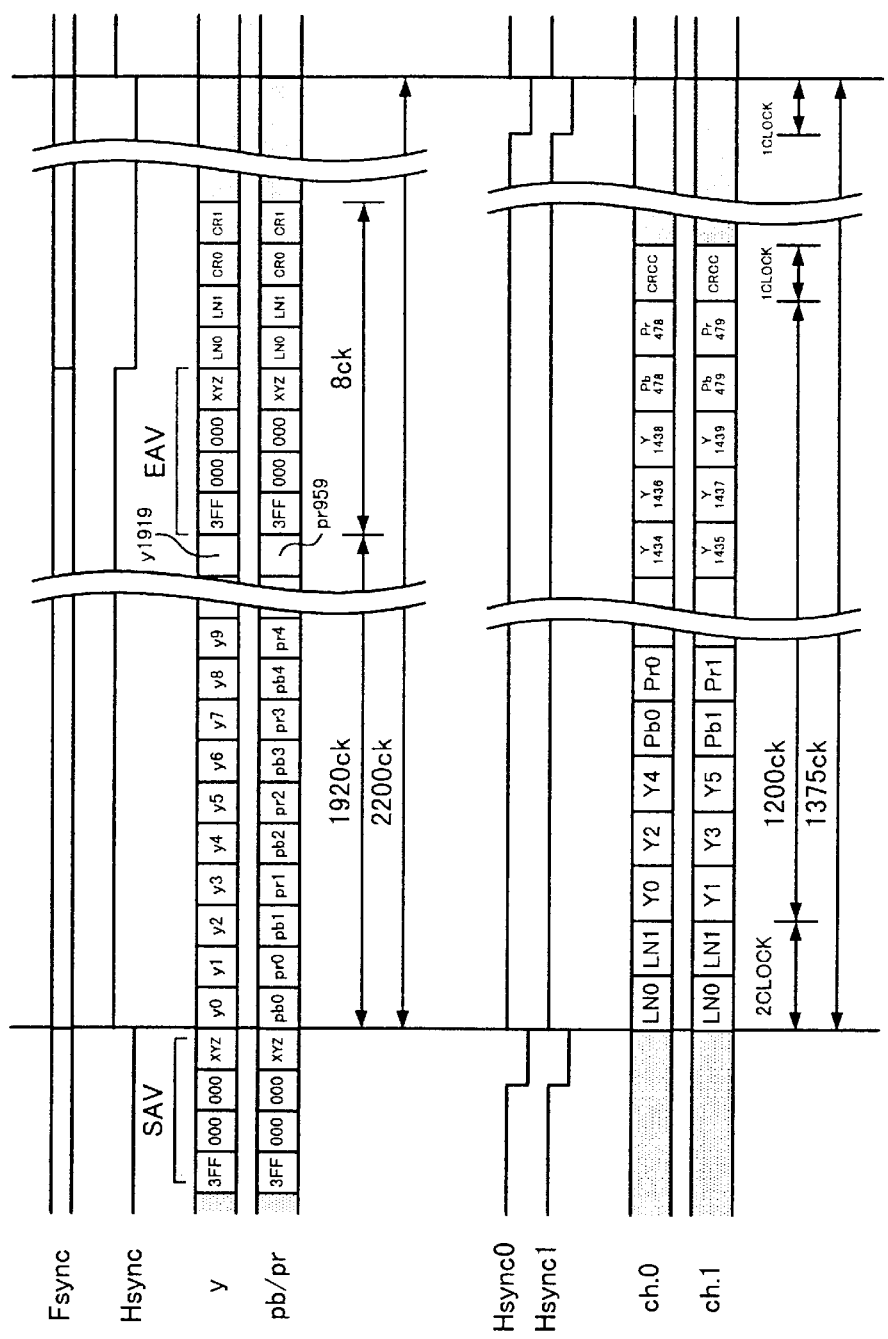
FIGS. 10A and 10B are schematic diagrams showing a signal format sent among each circuit (IC)

FIG. 10A shows an example of a (4:2:2) with auxiliary data added by the coprocessor 12. A brightness signal Y is successively sent corresponding to the clock signal of 74.25 MHz. On the other hand, since the band widths of the color difference signals Pr and Pb have been compressed, the amount of data thereof is halved. For example, brightness signals $Y_0$ and $Y_1$ correspond to color difference signals $Pr_0$ and $Pb_0$, respectively. Brightness signals $Y_2$ and $Y_3$ correspond to color difference signals $Pr_1$ and $Pr_2$, respectively.

Corresponding to a Hsync signal received from the timing generator 30, SAV and EAV are placed at the beginning and the end of 1920 clock pulses that represent a valid picture area of the (4:2:2) signal for four clock pulses each. After EAV, line numbers $LN_0$ and $LN_1$ generated corresponding to a line number LN are placed. After the line numbers $LN_0$ and $LN_1$, CRC check bits $CR_0$ and $CR_1$ are placed. The CRC check bits are added so as to detect an error of data sent among each IC chip. Since the number of valid lines in the vertical direction is 1125, a line number LN can be represented by 11 bits.

FIG. 10B show two-channel data $Ch_0$ and $Ch_1$ that are output from the format converting circuit 13. The period of the valid data in the signal is included in the period of 1200 clock pulses. When a HsyncO signal corresponding to the signal $Ch_0$ goes high, the HsyncO signal represents the start of one horizontal interval. The line numbers $LN_0$ and $LN_1$ are placed for two clock pulses. Thereafter, the brightness signal Y and the color difference signals Pr and Pb are serially placed. After the brightness signal Y and the color difference signals Pr and Pb for one line, a CRC check bit is placed for one clock pulse. At the 1375-th clock pulse of the Hsync signal at the beginning of one horizontal interval, the next Hsync signal takes place.

Figure 11:
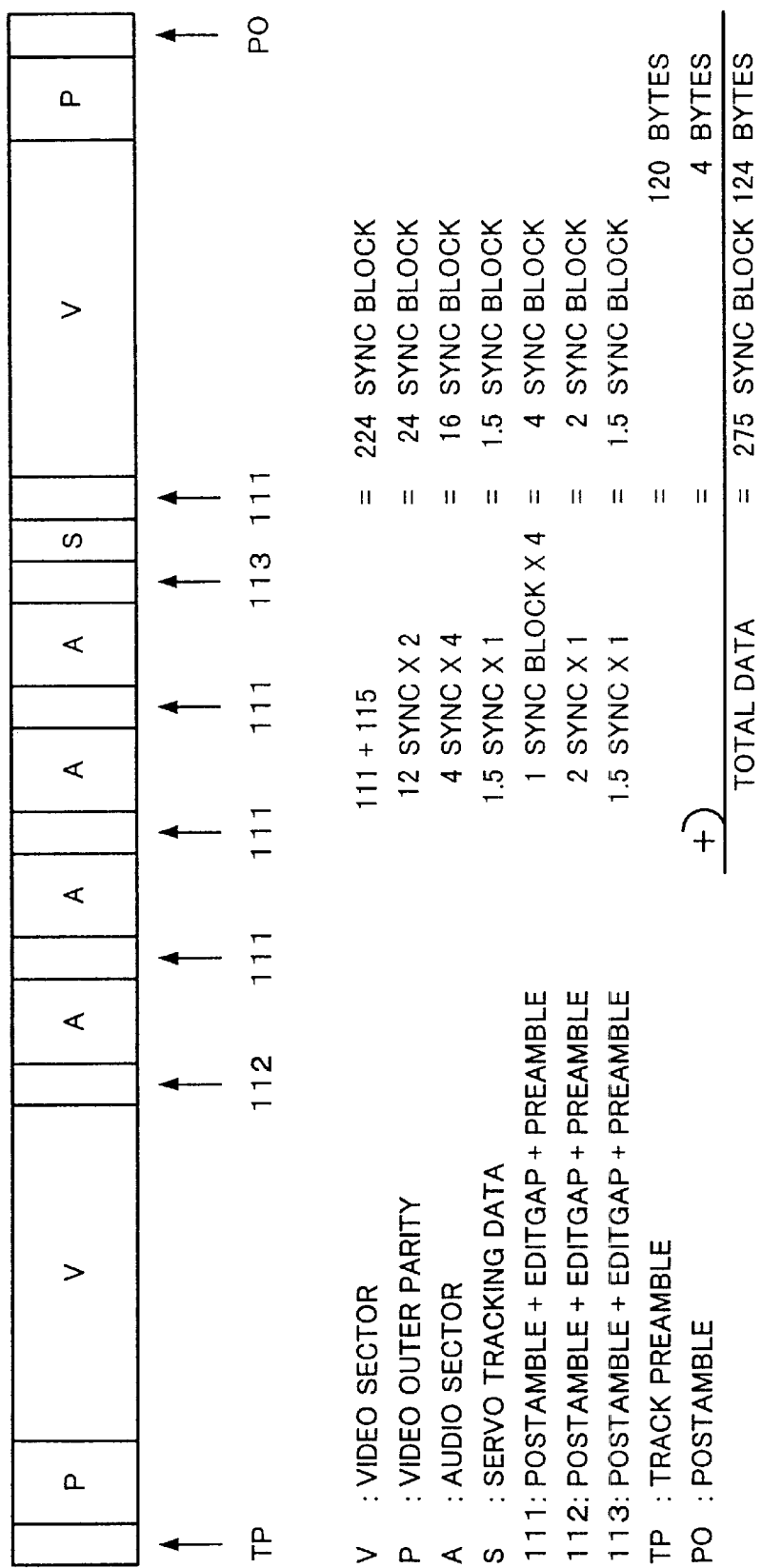
FIG. 11 is a schematic diagram showing an example of a data format of one track.

FIG. 11 shows a format of one track. This track represents a data arrangement in the tracing direction of a head. One track is largely divided into a video sector V and an audio sector A. As will be described later, video data and audio data in each track are encoded with a product code. In FIG. 11, P represents a parity of an outer code that takes place when video data is encoded with a product code. A parity of an outer code that takes place when audio data is encoded with a product code is recorded in an audio sector.

FIG. 11 shows an example of lengths of individual types of data recorded in one track. In this example, data of 275 sync blocks plus 124 bytes is recorded in one track. A video sector is composed of 226 sync blocks. The time period of one track is around 5.6 ms.

Figure 12:
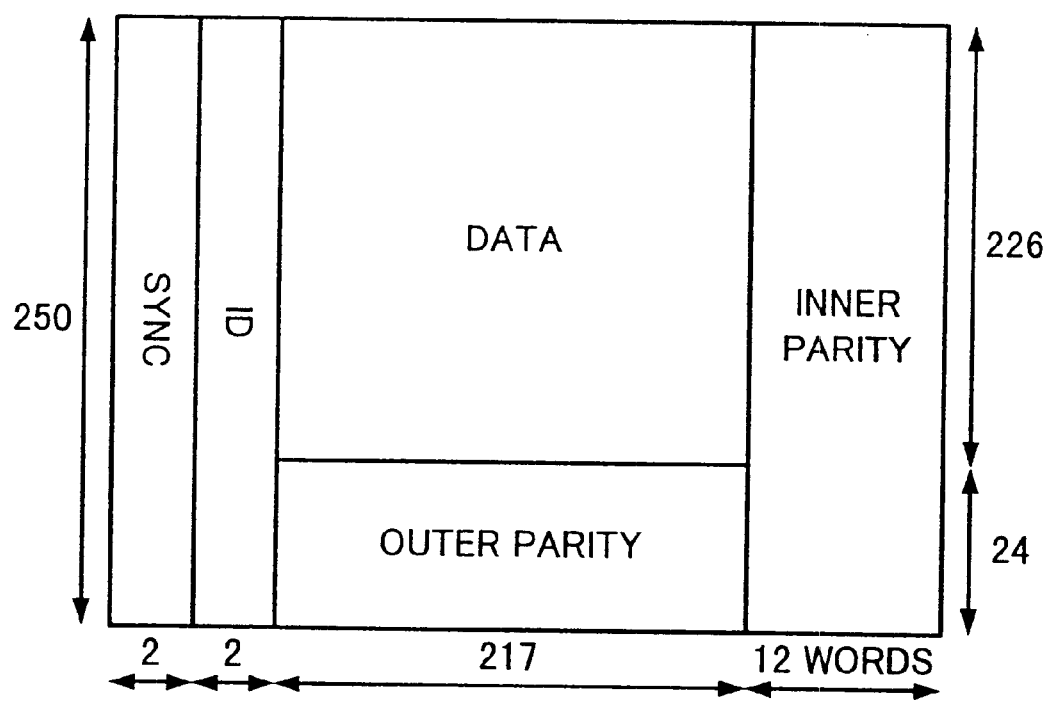
FIG. 12 is a schematic diagram for explaining an error correction code.

FIG. 12 shows an example of the structure of an error correction code against video data. Video data in each track is encoded with an error correction code. In other words, video data for one rack is arranged as 217×226 words. An encoding process is performed for 226 words (one word is equal to one byte) arranged in the vertical direction with (250, 226) Reed Solomon code (namely, an outer code). A parity of an outer code of 24 words is added. With the outer code, an error correction of up to 10 words can be performed. In addition, an erasure correction of up to 24 words can be performed.

An ID of two words is added to 217 words arranged in the horizontal direction of a two-dimensional array (video data or parity of an outer code). An encoding process is performed for (217+2=219) words arranged in the horizontal direction with (231, 219) Reed Solomon code (inner code). Thus, a parity of an inner code of 12 words is generated. With the inner code, for example, an error of up to four words is corrected. Alternatively, an erasure flag for correcting an error with an outer code is generated.

As with video data, audio data is encoded with a product code although the data amount of one track of the video data is different from that of the audio data.

Data is encoded with an outer code. The resultant data with an ID is encoded an inner code. Data is cut in the encoding direction of the inner code. A block sync is added to the resultant data. Thus, one sync block is formed. In other words, a block sync of two words is added to (2+217+12=231) words of each line of the arrangement shown in FIG. 12. On the magnetic tape, if necessary, data of successive sync blocks is digitally modulated and then recorded.

Figure 13:
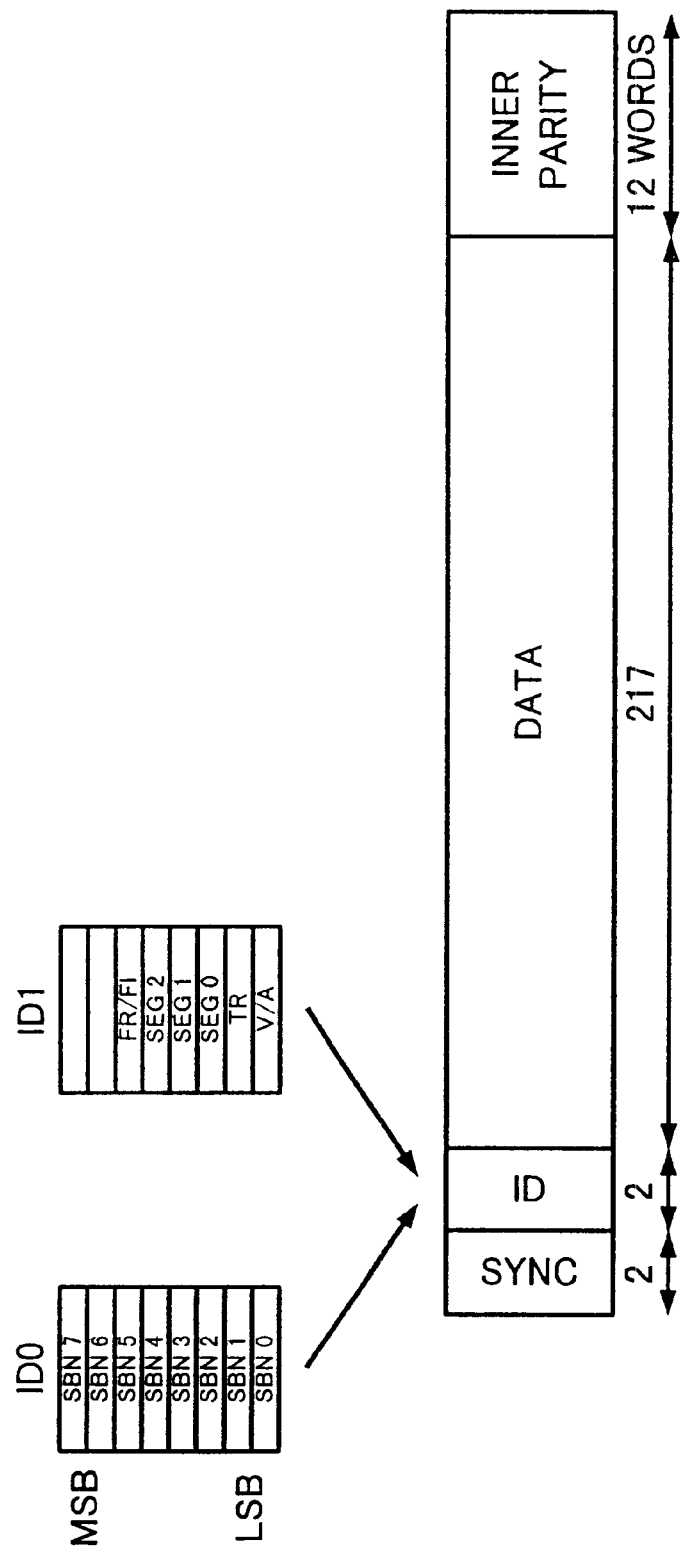
FIG. 13 is a schematic diagram showing a data format of one sync block.

FIG. 13 shows the structure of one sync block. An ID of a sync block is composed of two words (two bytes) that are ID0 and ID1. ID0 represents a sync block number. SBN0 represents LSB. SBN7 represents MSB. ID1 has the following bits.

V/A: video sector=0, audio sector=1

TR: track number

SEG0 to SEG2: segment number

FR/F1: intra-frame encoding=1, intra-field encoding =0

The first one word of 217 words of each sync block is a data header. A sync error flag of one bit is placed in the data header along with information that represents a quantizing characteristic of data.

The feature of the embodiment of the present invention is in that a field editing process can be performed. Next, with reference to a timing chart shown in FIG. 14, the recording/ reproducing operation and the field editing operation will be described. As represented by an upper portion of FIG. 14, it is assumed that the frame number varies in the order of −2, −1, 0, 1, and so forth and that the field number varies in the order of −4, −3, −2, −1, 0, 1, 2, 3, and so forth. As will be described later, the selector 15 switches between the field numbers 0 and 1 of the frame number 0 so as to select an input signal from a reproduced signal.

Signals are obtained from reproducing heads. One frame of the reproduced signals is composed of a first channel of track numbers 1, 3, 5, 7, 9, and 11 (A/C) and a second channel of track numbers 2, 4, 6, 8, 10, and 12 (B/D). The ECC decoder 41 corrects an error of a reproduced RF signal. The ECC decoder 41 takes a correcting time for an outer code in each track. The ECC decoder 41 adjusts the timing of each track.

An output signal of the ECC decoder 41 is sent to the BRR decoder 41. The BRR decoder 43 decodes a signal th a has been compressed and encoded. Since the BRR decoder 43 de-shuffles data for one frame, a delay for one frame takes place. The BRR decoder 43 outputs signals for original fields. The first field and the second field reproduced from the tape are denoted by PB#0 and PB#1, respectively.

An output signal of the BRR decoder 43 is sent to the concealing circuit 45. After the concealing circuit 45 has performed an interpolating process for an error, it outputs the resultant signal to a normal VTR reproducing system and a system for a field editing process. The signal sent to the normal reproducing system has a delay for the interpolating process for several lines. The resultant signal is sent to the output terminal 54 through the format converter 47, the video processor 49, the coprocessor 51, and the P/S converter 53. The timing of the output picture synchronizes with an external synchronous signal of the VTR or an internal signal of the VTR.

In the system for the field editing process, the concealing circuit 45 adjusts the delay against the phase of the input video data and sends the resultant signal to the selector 15 of the recording system. On the other hand, a video signal received from the input terminal 10 is sent to the selector 15 through the coprocessor 12 and the format converter 13. The first field and the second field of the input video data are denoted by IN#0 and IN#1, respectively.

The selector 15 switches the output data from the reproduced data to the input video data at the end of a field of the frame 0. The selected output result is a frame with a combination of PB#0 and IN#1. Thereafter, an input picture is recorded.

The signal selected by the selector 15 is compressed and encoded by the BRR encoder 18. In the signal selected by the selector 15, when the movement of pictures between the fields is large, the BRR encoder 18 performs the intra-field compressing and encoding process. When the movement of pictures is small, the BRR encoder 18 performs the intra-frame compressing and encoding process. Since the BRR encoder 18 shuffles DCT blocks in each frame, it outputs the resultant signal with a delay for one frame.

After the signal received from the BRR encoder 18 is encoded with an error correction code, the resultant signal is recorded on a magnetic tape. In this case, the ECC encoder 22 outputs the signal with a delay for the calculating time of the outer code. In the example shown in FIG. 14, the signal that is output from the ECC encoder 22 has a delay for around one track. On the tape, data is recorded in such a manner that the original video data and the input video data are connected. Thus, the field editing process can be performed.

In the above embodiment, a controlling operation for a signal delay in each stage was simply described. However, delays in the concealing circuit 45, the format converter 13, and so forth should be controlled so that the phase of the input picture precisely accords with the phase of the reproduced picture in the selector 15.

As described above, with the VTR that can perform the field editing process, a pre-read editing process can be easily performed. When a picture that is reproduced from a tape is directly recorded, the system for the field editing process can be used as it is. When a picture reproduced from a tape is processed (for example, after the gain of a picture is adjusted, the resultant picture is recorded), a circuit for sending an output signal of the video processor 49 back to the selector of the recording system is provided.

As described above, an output signal of the concealing circuit 45 or the BRR decoder 43 is sent back to the selector of the recording system. The reproducing heads are operated in advance of the recording heads for a delay of the entire system (from the reproducing heads to the recording heads). The selector 15 switches between the reproduced data and the input data at the end of each field. Thus, a digital VTR that can perform the field editing process can be structured. In addition, the BRR encoder 18 can select either the intra-field encoding process or the intra-frame encoding process. When information that represents the selected encoding process is recorded on the tape, even if a picture largely varies at the end of a field, the efficiency of the compression does not deteriorate.

In the block diagram shown in FIG. 1, each function is represented as an error correcting encoder. However, in reality, such functions are accomplished as independent IC chips.

In the above embodiment, an example of which the present invention is applied for the 1125 lines/60 Hz format was descried. However, the present invention is not limited to such a format. For example, the present invention can be applied for the NTSC format of which the field frequency is 59.94 Hz. In this case, each interface frequency and clock signal frequency is divided by 1.001 (=60/59.94).

In addition, the present invention can be applied for a recording/reproducing system for only a video signal.

As described above, the present invention provides the following effects.

When the intra-frame compressing and encoding process is used, the field editing process can be performed.

Even if pictures that largely vary in the fields of a frame are recorded, since the intra-field compressing and encoding process or the intra-frame compressing and encoding process can be adaptively selected, pictures can be effectively recorded.

With a signal path for the field editing process, the pre-read editing process of which a reproduced picture is not edited can be performed.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A digital video signal recording/reproducing apparatus for recording a digital video signal to a record medium and reproducing a digital video signal from a record medium, comprising:

a first encoder for performing a compressing process for an input digital video signal;

a second encoder for performing an error correction code encoding process for a compressed signal received from said first encoder;

recording means for recording an output signal of said second encoder to a record medium;

reproducing means for reproducing a signal from a record medium;

a second decoder for performing an error correction code decoding process for a signal received from said reproducing means;

a first decoder for performing a decompressing process for an output signal of said second decoder; and switching means, disposed in the preceding stage of said first encoder, for switching between a reproduced digital video signal that has been decompressed by said first decoder and the input digital video signal at the end of each field in a frame.

2. The digital video signal recording/reproducing apparatus as set forth in claim 1, wherein said reproducing means reproduces a signal from the record medium before said recording means records a signal, and wherein a signal reproduced from the record medium by said reproducing means is placed in advance of a signal recorded by said recording means by a time period in which said recording means records a signal to the record medium in synchronization with a change of a field of the input digital video signal.

3. The digital video signal recording/reproducing apparatus as set forth in claim 1, wherein said first encoder performs an intra-field compressing process as the compressing process in the case that the movement of a picture of the input digital video signal is large, and wherein said first encoder performs an intra-frame compressing process as the compressing process in the case that the movement of a picture of the input digital video is small.

4. The digital video signal recording/reproducing apparatus as set forth in claim 1, wherein said first encoder has:

a mode determining circuit for determining a compressing and encoding mode corresponding to an output signal of said switching means, and wherein the intra-field compressing process or the intra-frame compressing process is performed corresponding to an output signal of the mode determining circuit.

5. The digital video signal recording/reproducing apparatus as set forth in claim 4, wherein the mode determining circuit determines the correlation of pictures of individual fields with the sum and difference of pixel values in the fields, compares the resultant value and a predetermined threshold value, determines whether the movement of the pictures is large ro small corresponding to the compared result, selects one of the intra-field compressing process or the intra-frame compressing process, and places information that represents the selected compressing process in an ID of a sync block as a record element.

6. The digital video signal recording/reproducing apparatus as set forth in claim 1, further comprising:

concealing means, disposed in the next stage of said first decoder, for concealing an error in an output signal of said first decoder, wherein said switching means switches between an output signal of said concealing means and the input digital video signal.

7. A digital video signal recording/reproducing method for recording a digital video signal to a record medium and reproducing a digital video signal from a record medium, comprising the steps of:

compressing an input digital video signal;

encoding the compressed signal with an error correction code;

recording the signal that has been encoded with the error correction code to a record medium;

reproducing a signal from a record medium;

decoding the reproduced signal that has been encoded with the error correction code;

decompressing the decoded signal; and switching between a reproduced digital video signal that has been decompressed and the input digital video signal at the end of each field in a frame.

* * * * *